United States Patent Office 2,803,649
Patented Aug. 20, 1957

2,803,649

1,2-DIHALOGENOPROPIONO-HYDROXAMIC ACID AND PROCESS FOR PRODUCING SAME

Edward B. Hodge, Terre Haute, Ind., assignor to Commercial Solvents Corporation, Terre Haute, Ind., a corporation of Maryland No Drawing. Application July 26, 1955,
Serial No. 524,593

5 Claims. (Cl. 260—500)

My invention relates to propionohydroxamic acid derivatives and more particularly it relates to substituted 2,3-dihalogenopropionohydroxamic acids and to a method for producing the same.

My new compositions are useful in the synthetic production of the antibiotic cycloserine and derivatives thereof. Cycloserine is the generic name given the composition 4-amino-3-isoxazolidinone having the following structural formula.

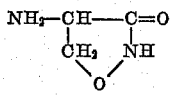

My new composition has the following structural formula:

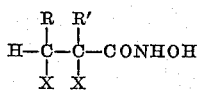

where R and R' are hydrogen, alkyl, or aryl and X is a halogen. Cycloserine or a derivative thereof can be obtained from my new compounds by cyclizing the same in the presence of ammonia.

My new 2,3-dihalogenopropionohydroxamic acids can be obtained by reacting hydroxylamine with a 2,3-dihalogenopropionyl halide having the following structural formula:

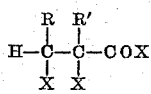

where X is chlorine or bromine and R and R' are hydrogen, alkyl or aryl. The reaction is carried out at low temperatures and in the presence of an inert solvent. I prefer to employ temperatures ranging from about −5 to about 5° C.; however, temperatures up to about 25–30° C. can be employed. Hydroxylamine is preferably produced in situ by reaction of hydroxylamine hydrochloride and an alkali metal alkoxide such as, for example, sodium methoxide, in the presence of an inert solvent such as methanol. To the hydroxylamine is then added the 2,3-dihalogenopropionyl halide, the mixture stirred at low temperature and the 2,3-dihalogenopropionohydroxamic acid then recovered from the reaction mixture. In producing my new composition I employ the theoretical proportions of reactants i. e. one mole of the 2,3-dihalogenopropionyl halide and two moles of hydroxylamine. My new composition can be recovered by concentrating the reaction mixture, treating the residue with ether and evaporating the ether to obtain the crystalline product. The crystallization is preferably preceded by removal of impurities by filtration of the ether solution.

The following examples are offered to illustrate my invention; however, I do not intend to be limited to the specific materials, proportions and procedures shown. Rather I intend for all equivalents obvious to those skilled in the art to be included within the scope of my invention.

Example I

To 14 grams of hydroxylamine hydrochloride in 100 ml. of methanol was added 10.8 grams of sodium methoxide in 100 ml. of methanol at 10° C. to produce hydroxylamine in situ. To the hydroxylamine solution was then added dropwise with stirring, 16.2 grams of 2,3-dichloropropionyl chloride in 50 ml. of benzene at 0–5° C. The addition was complete in 15 minutes. The reaction mixture was then filtered and concentrated at reduced pressure to a soft semi-solid mass which was treated with 100 ml. of ether, the mixture filtered and the ether evaporated to obtain 12 grams of product as soft crystals. The product was recrystallized from benzene to give 2,3-dichloropropionohydroxamic acid melting at 104–105.5° C.

Example II 2,3-dibromopropionohydroxamic acid was produced by the method of Example I except that 2,3-dibromopropionyl chloride was employed as the starting material rather than 2,3-dichloropropionyl chloride. The product had a melting point of 138–139° C.

Example III 2,3-dibromo-2-methylpropionohydroxamic acid was produced by the method of Example I except that 2,3-dibromo-2-methylpropionyl chloride was employed as the starting material. The product had a melting point of 115–116° C.

Example IV 2,3-dibromo-2-phenylpropionohydroxamic acid was produced by the method of Example I except that 2,3-dibromo-2-phenylpropionyl chloride was employed as the starting material rather than 2,3-dichloropropionyl chloride.

Now having described my invention, what I claim is:

1. As a composition of matter, the compounds having the following structural formula

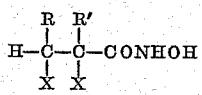

where X is a halogen selected from the group consisting of chlorine and bromine and R and R' are selected from the group consisting of hydrogen, lower alkyl, and phenyl.
2. 2,3-dichloropropionohydroxamic acid.
3. 2,3-dibromopropionohydroxamic acid.
4. 2,3-dibromo-2-methylpropionohydroxamic acid.
5. 2,3-dibromo-2-phenylpropionohydroxamic acid.

References Cited in the file of this patent

FOREIGN PATENTS 906,146    France _____ Dec. 24, 1945

OTHER REFERENCES

Karrer: Organic Chemistry, p. 225 (1950).